United States Patent
Ryu et al.

(10) Patent No.: US 10,726,232 B2
(45) Date of Patent: Jul. 28, 2020

(54) FLAT PANEL DISPLAY HAVING OPTICAL SENSOR

(71) Applicant: LG Display Co., Ltd., Seoul (KR)

(72) Inventors: Seungman Ryu, Paju (JP); Guensik Lee, Daegu (KR); Joobong Hyun, Daegu (KR); Ara Yoon, Daegu (KR)

(73) Assignee: LG Display Co., Ltd., Seoul (KR)

( * ) Notice: Subject to any disclaimer, the term of this patent is extended or adjusted under 35 U.S.C. 154(b) by 171 days.

(21) Appl. No.: 15/969,360

(22) Filed: May 2, 2018

(65) Prior Publication Data

US 2018/0322324 A1 Nov. 8, 2018

(30) Foreign Application Priority Data

May 2, 2017 (KR) ........................ 10-2017-0056314

(51) Int. Cl.
*G06K 9/00* (2006.01)
*G02B 5/32* (2006.01)

(52) U.S. Cl.
CPC ............. *G06K 9/0002* (2013.01); *G02B 5/32* (2013.01); *G06K 9/0004* (2013.01); *G06K 9/00087* (2013.01)

(58) Field of Classification Search
CPC .............. G06K 9/0002; G06K 9/0004; G06K 9/00087; G06K 9/00046; G02B 5/32; G06F 1/1643
See application file for complete search history.

(56) References Cited

U.S. PATENT DOCUMENTS

2016/0342282 A1* 11/2016 Wassvik .............. G02F 1/13338

* cited by examiner

*Primary Examiner* — Menatoallah Youssef
(74) *Attorney, Agent, or Firm* — Fenwick & West LLP

(57) ABSTRACT

The present disclosure relates to a flat panel display having an optical imaging sensor such as a fingerprint image sensor. The present disclosure provides a flat panel display having an image sensor comprising: a display panel including a display area and a non-display area, the display panel having a top surface; a directional optical unit attached to the top surface of the display panel, the directional optical unit having a length along a length axis of the display panel, a width along a width axis of the display panel and a thickness along a thickness axis of the display panel; a sensing light control film disposed under the display panel; and an image sensor disposed under the sensing light control film.

6 Claims, 5 Drawing Sheets

$T_{CP\_AIR} < \alpha < T_{VHOE\_LR} < \theta$ ex) $45° < \alpha < 55°$
$70° < \theta < 75°$

FLAT PANEL DISPLAY HAVING OPTICAL SENSOR

CROSS-REFERENCE TO RELATED APPLICATIONS

This application claims the benefit of Republic of Korea Patent Application No. 10-2017-0056314 filed on May 2, 2017, which is incorporated herein by reference in its entirety.

BACKGROUND

Technical Field

The present disclosure relates to a flat panel display having an optical imaging sensor such as a fingerprint image sensor. In particular, the present disclosure relates to a flat panel display having an optical imaging sensor including an ultra thin substrate providing the directional lights and an optical imaging sensor.

Description of the Related Art

Various computer based systems including the notebook computer, the tablet personal computer (or, PC), the smart phone, the personal digital assistants, the automated teller machines and/or the search information system have been developed. As these devices use and store the various personal information as well as the business information and the trade secrets, it is desirable to strengthen the securities for preventing these important data being leaked.

To do so, one method has been suggested for strengthening the security using an image sensor recognizing the authorized user's biological information. For example, the fingerprint sensor is generally used for enhancing the security when registering and authenticating is performed. The fingerprint sensor is for sensing the fingerprint of user. The fingerprint sensor may be categorized into the optical fingerprint sensor and the capacitive fingerprint sensor.

The optical fingerprint sensor uses a light source such as a light emitting diode (or LED) to irradiate light and detects the light reflected by the ridge of the fingerprint using a CMOS (or, complementary metal oxide semiconductor) image sensor. As the optical fingerprint sensor may scan the fingerprint using the LED light, it is required that the sensor is equipped with an additional device for performing the scan process. There is a limitation to increasing the size of the object for scanning the image. Therefore, there are limitations for applying the optical fingerprint sensor to various applications such as combining with the display devices.

For conventional optical fingerprint sensors, known are a Republic of Korea patent 10-060817 registered on Jun. 26, 2006 titled "A display apparatus having fingerprint identification sensor" and a Republic of Korea patent application 10-2016-0043216 published on Apr. 21, 2016 titled "Display device including fingerprinting device".

The above mentioned optical fingerprint sensor is configured to use the display area as the touch area for inputting the user's selection and the sense area for sensing the fingerprint. However, this optical fingerprint sensor uses the diffused (or diverged) lights having very low directivity. Therefore, there is a limitation to recognize the exact fingerprint pattern. When using the collimated lights such as the infrared laser having high directivity, it is very hard to generate the sensing lights to cover the wider area. Therefore, the fingerprint sensing area is restricted in a small area. In order to radiate the collimated lights over the wider scan area, specific scanning structure is required, so that this system is not suitable for portable or personal display apparatus.

Therefore, for portable devices embedding the fingerprint sensor, the capacitive fingerprint sensor is mainly used. However, the capacitive fingerprint sensor also has many problems.

The capacitive fingerprint sensor is configured to detect the difference of the electricity between the ridge and the valley of the fingerprint contacting on the fingerprint sensor. For conventional capacitive fingerprint sensors, known is a US patent application 2013/0307818 published on Nov. 21, 2013 titled "Capacitive Sensor Packaging".

The above mentioned capacitive fingerprint sensor is configured as an assembly type embedding with a specific push button. It comprises a capacitive plate and a silicon wafer having a circuit for detecting the capacitive storage between the ridge and valley of the fingerprint. Generally, as the sizes of the ridge and valley of the fingerprint are very tiny, about 300~500 μm (micrometer), the capacitive fingerprint sensor needs a high resolution sensor array and an integrated chip (or IC) for processing the fingerprint detection. To do so, the silicon wafer is configured to include the sensor array and the IC on one substrate.

However, when the high resolution sensor array and the IC are formed on the same silicon wafer, the assembly structure for joining the push button with the fingerprint sensor is required. Therefore, the structure would be very complex and further the non-display area (or bezel area) may be increased. In some cases, the push button (i.e., the home key of the smart phone) would be overlapped with the fingerprint sensor, so that the thickness of the whole device would be thick. Further, the sensing area for the fingerprint would be dependent on the size of the push button.

To solve above mentioned problems and limitations, some technologies have been suggested in which the touch sensor area is used as for sensing the fingerprint. For example, known are U.S. Pat. No. 8,564,314 issued on Oct. 22, 2013 titled "Capacitive touch sensor for identifying a fingerprint", and Republic of Korea patent 10-1432988 registered on Aug. 18, 2014 titled "A capacitive touch screen for integrated of fingerprint recognition".

In general cases of the personal portable devices such as the smart phones, an additional transparent film is attached for protecting the display glass panel. When the above mentioned technologies are applied to the personal portable devices, as attaching the protective film thereon, the performance for sensing or recognizing the fingerprint exactly would be remarkably degraded. In general, even though the protective film is attached, the touch function may be properly operated. However, the detection ability for the difference of the capacitive storage amount for sensing the fingerprint may be deteriorated by the protective film even though its thickness is very thin.

For a display embedding the capacitive fingerprint sensor, generally a protective film or a hardening glass may be further attached on the cover glass of the display. In that case, the recognition ability may be deteriorated. That is, the total thickness of the cover glass may affect to the sensitivity of the capacitive fingerprint sensor. In the interim, the diffused lights used in the sensing light source may affect to the sensitivity of the optical fingerprint sensor. When using the collimated lights for enhancing the sensitivity of the optical fingerprint sensor, the bulky and/or complex optical devices are required so that it is very hard to apply to a display for personal mobile device.

Consequently, there is a need for a new type optical image sensor capable of large area sensing, excellent resolution and accuracy, and having an ultra thin thickness structure. In particular, there is an increasing need for an optical image sensor which is easy to develop various information processing apparatuses in combination with the flat panel displays.

SUMMARY

In order to overcome the above mentioned drawbacks, a purpose of the present disclosure is to provide a flat panel display having an ultra thin optical image sensor (or an optical image recognition apparatus). Another purpose of the present disclosure is to provide a flat panel display having an optical image sensor in which most or all of a surface of the display panel may be used for the sensing area. Still another purpose of the present disclosure is to provide a flat panel display having an optical image sensor in which a directional light is used as a sensing light covering a large surface area. Yet another purpose of the present disclosure is to provide a flat panel display having an ultra thin and large area optical image sensor of which resolution and sensitivity are very high and/or superior, by using a directional light and by maximizing the light efficiency. Still yet another purpose of the present disclosure is to provide a flat panel display having an optical image sensor in which the sensing accuracy is enhanced by eliminating the light noise caused by the scattering of the sensing light inside of the display panel.

In order to accomplish one or more of the above purposes, the present disclosure provides a flat panel display having an image sensor comprising: a display panel including a display area and a non-display area, the display panel having a top surface; a directional optical unit attached to the top surface of the display panel, the directional optical unit having a length along a length axis of the display panel, a width along a width axis of the display panel and a thickness along a thickness axis of the display panel; a sensing light control film disposed under the display panel; and an image sensor disposed under the sensing light control film.

In one embodiment, the directional optical unit includes: a cover plate having a size corresponding to the length and the width of the directional optical unit; a light radiating film corresponding to the display area, the light radiating film positioned under the cover plate; a light incident film positioned under the cover plate and disposed outside of the display area adjacent to a lateral side of the light radiating film; a low refractive layer disposed under the light radiating film and the light incident film, the low refractive layer attached on the top surface of the display panel, and having a refractive index that is lower than a refractive index of the cover plate and that is lower than a refractive index of the light radiating film; and a light source positioned under the light incident film.

In one embodiment, the light source provides an incident light to an incident point defined on a surface of the light source provides an incident light to an incident point on a surface of the light incident film; the light incident film includes a first holographic pattern that converts the incident light to a propagating light having an incident angle satisfying an internal total reflection condition of the cover plate, and that transmits the propagating light into the cover plate; and the light radiating film includes a second holographic pattern that converts a first portion of the propagating light into the sensing light, the sensing light having a reflection angle that satisfies a total reflection condition at a top surface of the cover plate and that satisfies a transmitting condition through the low refractive layer.

In one embodiment, the propagating light has an expanding angle on a horizontal plane including the length axis and the width axis, and the propagating light maintains the collimated state on a vertical plane including the length axis and the thickness axis; the incident angle is a larger than an internal total reflection critical angle at a first interface between the light radiating film and the low refractive layer; and the reflection angle is larger than a total reflection critical angle at a second interface between the cover plate and an air layer, and smaller than a total reflection critical angle at the first interface between the light radiating film and the low refractive layer.

In one embodiment, the sensing light control film includes: a holographic element refracting a sensing light having a predetermined direction to a parallel direction to a normal line to a bottom surface of the display panel.

In one embodiment, the flat panel display further comprises an ultra low refractive layer disposed between the sensing light control film and the image sensor, having a surface area corresponding to the sensing light control film, and having a refractive index higher than 1.0 and lower than 1.1, wherein the image sensor has a thin film shape having an area corresponding to the sensing light control film.

In one embodiment, the flat panel display panel further comprises: a housing disposed under the sensing light control film, and having a size corresponding to some portions of the sensing light control film, wherein the image sensor is disposed inside of the housing as being apart from the sensing light control film with a predetermined distance, and wherein an air layer is disposed between the sensing light control film and the image sensor.

The present disclosure provides a flat panel display having an optical image sensor that has a high resolution recognizing ability or sensitivity by providing the directionized lights (or 'oriented') as the sensing lights. Comparing with the diffused lights used in the conventional art for the fingerprint sensor, because that the directionized lights according to the present disclosure are used for sensing the image without any loss of lights, the present disclosure has the merits of the higher resolution and the superior sensitivity. The present disclosure provides a flat panel display having a large area optical image sensor in which a collimated infrared laser beam is expanded over a large area corresponding to the display panel for the sensing lights using a holography technology. The present disclosure provides a flat panel display having an ultra thin optical image sensor in which a direction light is provided on the display surface within a thin thickness. Specifically, by making the sensing light to enter into the surface of the image sensor vertically, the light amount or intensity of the sensing light is not reduced so that more accurate recognition result can be acquired. Further, it is possible to maximize the accuracy of the image sensing results by eliminating the noise lights caused by scattering as the light is passing through the display panel, and by selectively inputting only the sensing lights satisfying a predetermined incident angle condition vertically to the image sensor.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

DETAILED DESCRIPTION

Figure 1:
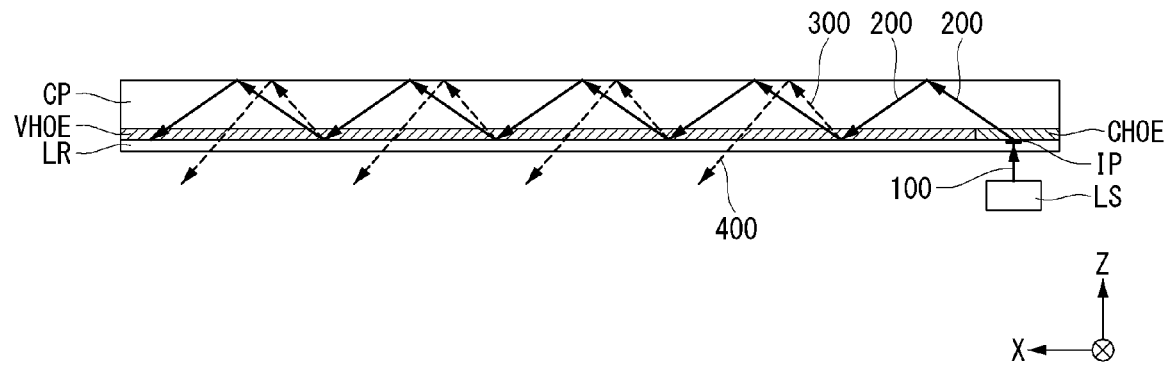
FIG. 1 is a drawing illustrating a structure of a directional optical substrate applied for a flat panel display having an optical image sensor according to a first embodiment of the present disclosure.
Figure 1:
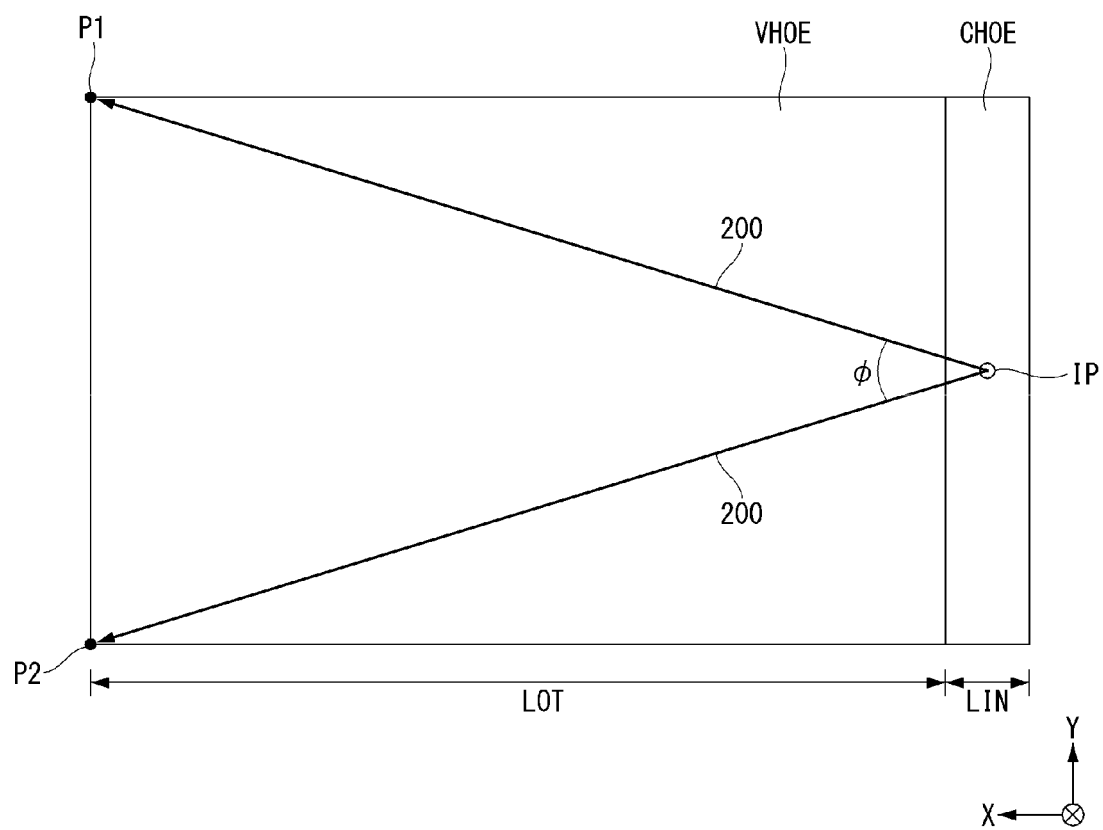

Referring to the attached figures, different embodiments of the present disclosure will be explained. Like reference numerals designate like elements throughout the detailed description. However, the present disclosure is not restricted by these embodiments but can be applied to various changes or modifications without changing the technical spirit of the disclosure. In the following embodiments, the names of the elements are selected by considering the easiness for explanation so that they may be different from actual names.

First Embodiment

Figure 2:
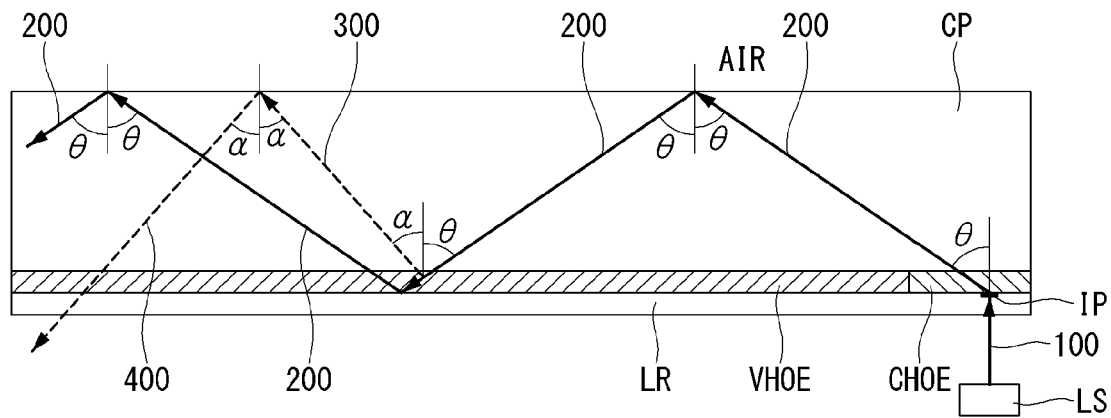
FIG. 2 is a cross sectional view illustrating light paths inside of the direction optical substrate shown in FIG. 1 according to one embodiment of the present disclosure.
Figure 2:
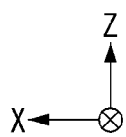

Hereinafter, referring to FIGS. 1 and 2, a first embodiment of the present disclosure will be described. FIG. 1 is a drawing illustrating a structure of a directional optical substrate applied for a flat panel display having an optical image sensor according to the first embodiment of the present disclosure. In FIG. 1, the upper drawing is a side view on the XZ plane and the lower drawing is a plane view on the XY plane.

Referring to FIG. 1, a directional optical unit according to the first embodiment comprises a directional optical substrate SLS and a light source LS. The directional optical substrate SLS includes a cover plate CP, a light radiating film VHOE, a light incident film CHOE and a low refractive layer LR. The cover plate CP may have a rectangular plate shape of which a length, a width and a thickness. In FIG. 1, the length is along to X-axis, the width is along to Y-axis and the thickness is along to Z-axis.

The directional optical substrate SLS is an optical device for providing the collimated light expanded covering a large area corresponding to a surface of the display. Therefore, it is preferable that the light source LS provides a collimated light. For example, the light source LS may be a laser diode providing the infra red laser beam. Since the infra red laser beam is very highly collimated, it is very suitable as the light source LS for the directional light unit according to the present disclosure. Alternatively, the light source LS may be an infrared diode providing an infrared ray having a very narrow expanding angle less than 10 degrees. When the expanding angle of the infrared ray emitted from the infrared diode is less than 10 degrees, the collimation property is highly enough even if the laser is not used. So that the infrared diode providing the infrared ray of which expanding angle of the ray is less than 10 degrees may be used as the light source LS for the directional light unit of the present disclosure.

On the bottom surface of the cover plate CP, the light radiating film VHOE and the light incident film CHOE is attached. The light radiating film VHOE is an optical element for providing the radiating lights 300. In one embodiment, the light radiating film VHOE is disposed as corresponding to the area for detecting and/or sensing the image. Alternatively, when the directional optical unit is joined with the flat panel display, the light radiating film VHOE may be disposed as corresponding to the area of the display panel.

The light incident film CHOE is an optical element for converting the collimated light provided from the light source into the lights expanded over the area of the cover plate CP. In one embodiment, the light incident film CHOE is disposed outside of and an adjacent to the light radiating film VHOE. Specifically, the light incident film CHOE is disposed as facing with the light source LS.

In one embodiment, the light radiating film VHOE and the light incident film CHOE may be disposed on the same plane level. Considering the manufacturing process, the light radiating film VHOE and the light incident film CHOE are formed as being separated each other, on a same film. The light radiating film VHOE and the light incident film CHOE may be optical elements having the holographic patterns. In this case, after disposing the master film for the light radiating film VHOE and the master film for the light incident film CHOE close each other, these two holographic patterns may be copied on one holographic recording film, at the same time. So that, the light radiating film VHOE and the light incident film CHOE may be formed on one film sheet.

Under the bottom surface of the light radiating film VHOE and the light incident film CHOE, a low refractive layer LR is disposed. The low refractive layer LR has the refractive index lower than that of the cover plate CP and the light radiating film VHOE in one embodiment. For example, the cover plate CP may be formed of a transparent reinforced glass having a refractive index of 1.5. The light radiating film VHOE and the light incident film CHOE may be the transparent holographic recording film and may have a refractive index that is same as or slightly larger than that of the cover plated CP. Here, we use the case that the refractive index of the light radiating film VHOE and the light incident film CHOE are same as that of the cover plate CP. The refractive index of the low refractive layer LR is similar with the refractive index of the scanning objects in one embodiment. For example, when applying to the fingerprint sensor, the low refractive layer LR may have a refractive index of 1.4, which is similar with the refractive index of human skin, 1.39.

At the space under the light incident film CHOE, the light source LS is disposed as facing with the light incident film CHOE. In one embodiment, the light source LS provides a highly collimated light such as a LASER beam. Specifically, when applying to the system in which the fingerprint sensor is equipped with a portable display, the light source LS provides the infrared laser beam which cannot be recognized by the human eyes. For example, the light source LS may be selected any one including an infrared diode providing the infrared ray having expanding angle less than 10 degrees and an infrared laser diode providing the infrared laser beam.

The collimated light from the light source LS, as an incident light 100, having a predetermined cross sectional area is provided to a light incident point IP defined on the light incident film CHOE. In one embodiment, the incident light 100 enters onto the normal direction with respect to the surface of the incident point IP. However, embodiments provided by the present disclosure are not restricted as such. For example, in one or more embodiments, the incident light 100 may enter onto the incident point IP with an inclined angle with respect to the normal direction.

The light incident film CHOE converts the incident light 100 into a propagating light 200 having an incident angle and sends it into the cover plate CP. In one embodiment, the incident angle is larger than the internal total reflection critical angle of the cover plate CP. As the results, as repeating the total reflection, the propagating light 200 is propagating inside of the cover plate CP along to the X-axis, the length direction of the cover plate CP.

The light radiating film VHOE converts some amount of the propagating light 200 into the radiating light 300 and refracts the radiating light 300 to upper surface of the cover plate CP. Other portions of the propagating light 200 would continuously be propagating inside of the cover plate CP. The radiating light 300 is totally reflected at the upper surface of the cover plate CP, but it is transmitted through the low refractive layer LR at the bottom surface of the cover plate CP so that the radiating light 300 goes out of the directional optical substrate SLS. In other words, the radiating light 300 totally reflected at the upper surface of the cover plate CP would be a sensing light 400 as passing through the bottom surface of the cover plate CP.

As the propagating light 200 goes from the light incident film CHOE to the opposite side, a predetermined portion of the propagating light 200 is extracted as the radiating lights 300 by the light radiating film VHOE. The amount (or 'brightness' or 'luminance') of the radiating light 300 is determined by the light extraction efficiency of the light radiating film VHOE. For example, when the light extraction efficiency of the light radiating film VHOE is 3%, then 3% of the initial light amount of the propagating light 200 would be extracted at the first radiating point where the propagating light 200 firstly hits to the light radiating film VHOE. Then, the 97% of the propagating light 200 would be totally reflected at the first radiating point and goes on continuously. After that, at the second radiating point, 3% of the 97%, i.e., 2.91% of the initial amount of the propagating light 200 would be extracted as the radiating light 300.

Repeating this operation, a plurality of radiating lights 300 would be extracted from the first side where the light incident film CHOE is disposed to the opposite side of the cover plate CP. When the light radiating film VHOE has the light extraction efficiency same over all areas, the amount of the propagating light 200 is gradually lowered as propagating from the first side to opposite side. In order to get an evenly distributed amount of the lights over the whole area of the light radiating area, the light extraction efficiency of the light radiating film VHOE is exponentially increased from the first side to the opposite side.

As observing the propagating light 200 on the XZ plane (or, 'vertical plane') having the length axis and the thickness axis, the collimated condition of the incident light 100 is maintained. On the contrary, on the XY plane (or, 'horizontal plane') having the length axis and the width axis, the propagating light 200 is a diverged (or, expanded) light having an expanding angle, φ. The reason of expanding the propagating light 200 is that the image sensing area is set as covering most of the area of the cover plate CP. For example, the light radiating film VHOE has an area corresponding to the whole area of the cover plate CP. Further, the expanding angle φ is the inside angle between two lines, one line is connecting the incident point IP and one end point P1 of the opposite side of the cover plate CP and the other line is connecting the incident point IP and another end point P2 of the opposite side of the cover plate CP.

The area where the light incident film CHOE is disposed would be defined as a light entering part LIN. The area where the light radiating film VHOE is disposed would be defined as a light going-out part LOT. The light going-out part LOT would be the light propagating part where the light is going through. In FIG. 1, the light incident film CHOE covers the whole area of the light entering part LIN, in convenience. However, it is enough that the light incident film CHOE has a size slightly larger than the size of the light incident point IP.

For example, the cross sectional size of the collimated light generated from the light source LS may have the right circle shape of which radius is 0.5 mm. The light incident film CHOE would have the length corresponding to the width of the cover plate CP and the width of 3 mm ~5 mm. In this case, the light incident film CHOE may be disposed as crossing the width of the cover plate CP. In particular, the light incident film CHOE may be disposed at any one position including the middle position, the left position or the right position of the cover plate CP.

Hereinafter, referring to FIG. 2, we will explain how the collimated infrared light provided from the light source is converted into a directional infrared light used for image sensing inside of the directional optical substrate SLS. FIG. 2 is a cross sectional view illustrating light paths inside of the directional optical substrate according to the FIG. 1.

The incident light 100 provided from the light source LS enters onto the normal direction with respect to the surface of the incident point IP of the light incident film CHOE. The light incident film CHOE converts the incident light 100 into a propagating light 200 refracted as having an incident angle θ to the normal direction with respect to the surface of the incident point IP. And then, the light incident film CHOE provides the propagating light 200 to the inside space (or 'the media') of the cover plate CP.

In one embodiment, the incident angle θ of the propagating light 200 is larger than the total reflection critical angle $T_{VHOE\_LR}$ at the interface between the light radiating film VHOE and the low refractive layer LR. For example, when the refraction index of the cover plate CP and the light radiating film VHOE is 1.5, and the refraction index of the low refractive layer LR is 1.4, the total reflection critical angle $T_{VHOE\_LR}$ at the interface between the light radiating film VHOE and the low refractive layer LR is greater than 69° (degree). Therefore, the incident angle θ is larger than 69°. For example, the incident angle θ may be in the range of 70° to 75°, inclusive.

As the upper surface of the cover plate CP is in contact with the air AIR, the propagating light 200 is totally reflected at the upper surface of the cover plate CP. It is because that the total reflection critical angle $T_{CP\_AIR}$ at the interface between the cover plate CP and the air AIR is about 41.4°. That is, when the incident angle θ is larger than the total reflection critical angle $T_{VHOE\_LR}$ at the interface between the light radiating film VHOE and the low refractive layer LR, the incident angle θ is always larger than the total reflection critical angle $T_{CP\_AIR}$ at the interface between the cover plate CP and the air AIR.

The light radiating film VHOE converts a predetermined amount of the propagating light 200 into a radiating light 300 having a reflection angle α and sends the radiating light 300 back into the inside space of the cover plate CP. The radiating light 300 is for detecting an image of an object when the object is contacting on the upper surface of the cover plate CP. When there is no object on the outer surface of the cover plate CP, the radiating light 300 is totally reflected at the upper surface of the cover plate CP and then is provided to the photo sensor (or, optical sensor) disposed at the outside of the bottom surface of the directional optical substrate SLS. That is, after being totally reflected at the upper surface of the cover plate CP, the radiating light 300 goes out of the directional optical substrate SLS through the bottom surface of the cover plate CP. All of the sensing lights 400 have the same reflecting angle so that the sensing lights 400 are oriented (or 'directionized') to a predetermined direction.

In detail, the radiating lights 300 are provided from each points of the surface of the cover plate CP. However, the directions of the radiating lights 300 are same, i.e., all radiating lights 300 have the same radiation angle. We called the lights having the same radiation angle as the 'directional lights'. The radiating lights 300 having the same radiation angle are provided as the sensing lights 400. That is, the directional optical substrate SLS according to the present disclosure means an optical element that provides the radiating lights 300 and the sensing lights 400 having the same radiation angle.

Figure 3:
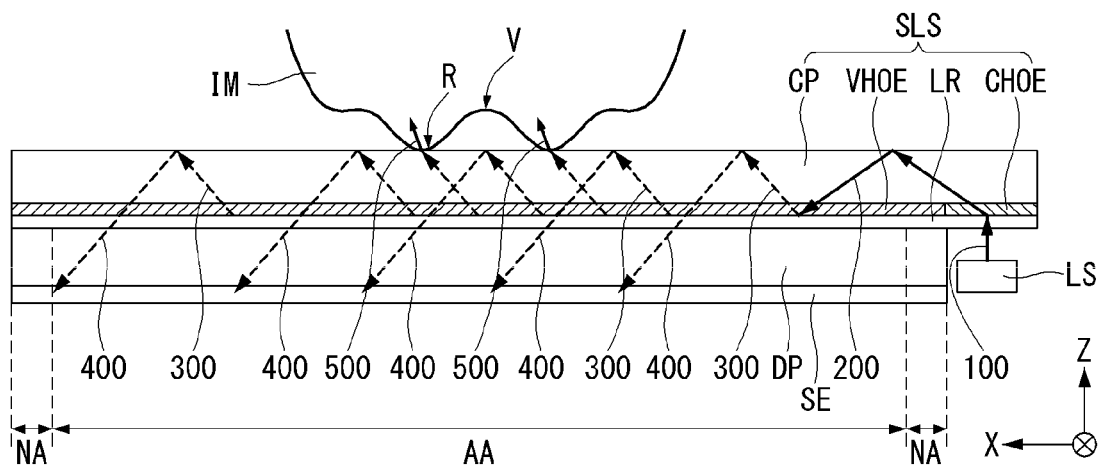
FIG. 3 is a drawing illustrating a structure of a flat panel display having an optical image sensor including a directional optical unit and an optical sensor, according to the first embodiment of the present disclosure.
Figure 3:
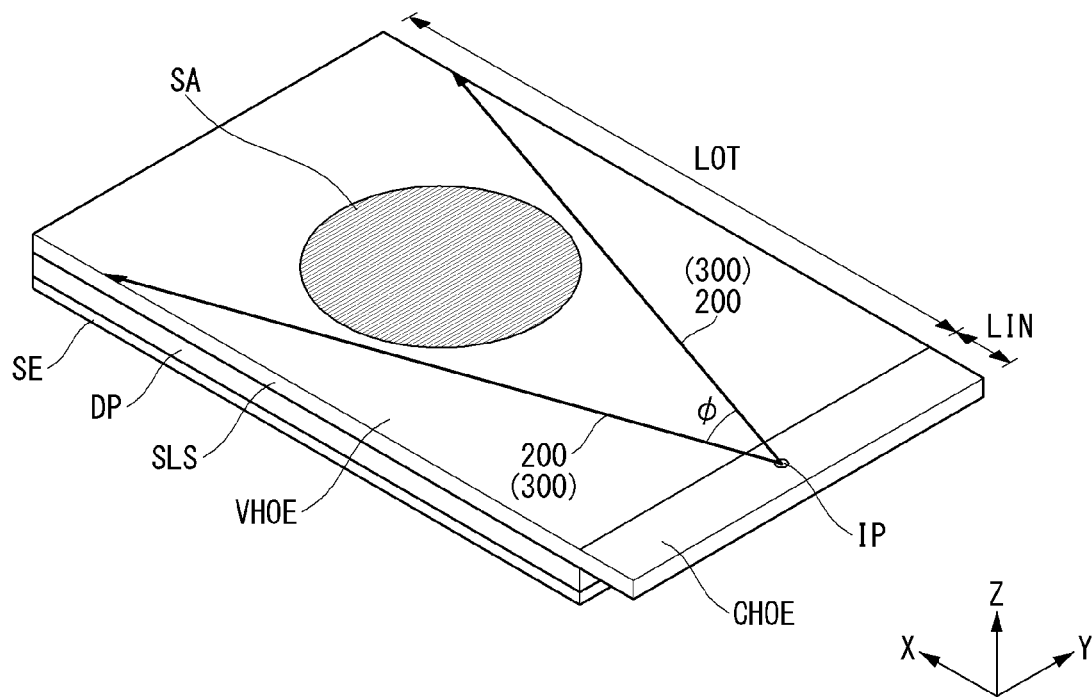

By detecting the sensing light 400 radiated out of the low refractive layer LR disposed under the bottom surface of the directional optical substrate SLS, the images of the object contacted on the upper surface of the cover plate CP may be recognized. Hereinafter, we will explain about the image sensing device applying the directional optical unit as shown in FIG. 1. Specifically, we focus on a flat panel display having a fingerprint recognizing sensor. FIG. 3 is a drawing illustrating a structure of a flat panel display having an optical image sensor including a directional optical unit and an optical sensor, according to the first embodiment of the present disclosure.

Referring to FIG. 3, a flat panel display having an optical image sensor according to the first embodiment of the present disclosure comprises a display panel DP, a directional optical substrate SLS, a light source LS and an image photo sensor (or 'image sensor') SE. The display panel DP includes a display area AA and a non-display area NA. The display area AA may be disposed at the middle portions of the display panel DP. The non-display area NA may be surrounding the display area AA. The display area AA may have a plurality of the display elements for representing the video images shown on the display panel DP. The non-display area may have a plurality of the driving elements for operating the display elements arrayed in the display area AA.

In detail, a plurality of pixel area for representing the video images may be arrayed in a matrix manner in the display area AA. Under the bottom surface of the display panel DP, the image sensor SE is disposed. The image sensor SE may have a rectangular thin film shape. The image sensor SE may be attached under the bottom surface of the display panel DP as corresponding to the display area AA. For example, a thin film type image sensor SE may have a plurality of photo sensors in which each photo sensor may be disposed as corresponding to each pixel. Otherwise, a thin film type image sensor SE may have a plurality of photo sensors in which each photo sensor may be disposed as corresponding to every pixel group including 2×2, 3×3 or 4×4 pixels.

The directional optical substrate SLS may be a thin plate having a predetermined length, width and thickness. In one embodiment, the length and width of the directional optical substrate SLS has a size corresponding to the size of the display panel DP. Specifically, the directional optical substrate SLS has a size slightly larger than that of the display panel DP. The directional optical substrate SLS has an extended (or expanded) area over one side of the display panel DP. At the extended side area over the display panel DP, the light source LS may be disposed.

The directional optical substrate SLS may be joined with the display panel DP as it is attached on the upper surface of the display panel DP. The directional optical substrate SLS includes a cover plate CP, a light incident film CHOE, a light radiating film VHOE and a low refractive layer LR, as mentioned above. The low refractive layer LR is attached on the upper surface of the display panel DP as facing each other. Here, the upper surface of the display panel DP is the front face providing the video images from the display panel DP. That is, the user observes the video image as seeing the upper surface of the display panel DP.

The directional optical substrate SLS, as mentioned above, may provide the image sensing light 400 to the bottom surface of the cover plate CP, which faces with the upper surface of the display panel DP. The sensing light 400 passes through the display panel DP and then reaches to the image sensor SE attached under the bottom surface of the display panel DP. As the sensing light 400 is detected by the photo sensor of the image sensor SE, the images of the object contacting on the upper surface of the directional optical substrate SLS may be recognized.

In detail, the radiating light 300 generated by the light radiating film VHOE of the directional optical substrate SLS would reach to the upper surface of the cover plate CP. When an object IM is disposed on the cover plate CP, the radiating light 300 that hits the areas where the object IM is not contacting the upper surface of the cover plate CP is totally reflected and provided to the display panel DP as the sensing light 400. On the contrary, the radiating light 300 that hits the area where the object IM is directly contacting the upper surface of the cover plate CP (e.g., at ridge R) is refracted and goes out through the cover plate CP.

At the point where the object IM having the refraction index larger than that of air is contacting, the radiating light 300 is not totally reflected but it is refracted into the object IM. That is, at the area where the object IM is contacting, the radiating light 300 would be an absorbed light 500 so that it is not provided to the image sensor SE.

As the results, the image sensor SE detects only the sensing lights 400 except the absorbed lights 500 among the radiating lights 300. Detecting the reflection patterns of the sensing lights 400 reflected at the top surface of the cover plate CP, the image sensor SE reproduces the patterns or images of the object IM.

When applying the directional optical unit to the fingerprint sensor, the object IM would be the finger of the human. The ridge R of the fingerprint is contacting on the top surface of the cover plate CP but the valley V of the fingerprint is not contacting with the top surface of the cover plate CP. The radiating lights 300 that hit the upper surface of the cover plate CP at the valley V are totally reflected to be the sensing lights 400. In the interim, the radiating lights 300 that hit the upper surface of the cover plate CP at the ridge R are refracted so that they would be the absorbed lights 500 going out of the cover plate CP.

Further referring to the lower drawing of FIG. 3, we will explain about the process of the image sensing on the XY plane. The incident light 100 may include a collimated infrared light having a predetermined cross sectional area. The light source LS may be an infrared LASER diode (or 'IR LD').

The incident light 100 would be converted to a propagating light 200 by the light incident film CHOE. Here, the propagating light 200 would be expanded as having an expanding angle φ on the XY plane including the length axis on the X axis and the width axis on the Y axis. In the interim, on the XZ plane including the length axis on the X axis and the thickness axis on the Z axis, the initial collimated condition would be maintained.

In one embodiment, the expanding angle φ is equal to or slightly larger than the inside angle of two lines connecting from the light incident point IP to the two end points (i.e., the two corners at the opposite side) of the cover plate CP facing the light incident film CHOE, respectively. In this case, the propagating light 200 may be expanded as a triangular shape having the expanding angle φ. As the results, the radiating lights 300 may covers the same area covered as the propagating light 200 is expanded. That is, the image sensing area would be defined inside of the triangular shape. When applying with the fingerprint sensor, the fingerprint sensing area SA may be defined as the circle area hatched in FIG. 3.

In one embodiment, when setting the sensing area SA on the center portion or on upside-shifted portion facing with the light incident film CHOE, the amount (or luminance or brightness) of the radiating lights 300 has a maximum value. To do so, the light radiating film VHOE may be designed as having varying light extraction efficiency according to the functional relationship with the position (i.e., the light radiating film VHOE may have a light extraction efficiency that varies as a function of position along the light radiating film VHOE), to have the maximum value at the area corresponding to the sensing area SA and to have a minimum or the zero value at the other areas (i.e., at areas outside of the sensing area SA).

For the flat panel display having an optical image sensor according to the first embodiment of the present disclosure, the sensing light 400 has a predetermined incident angle to the upper surface of the image sensor SE. That is, incident angle of the sensing light 400 is the angle with the normal line to the upper surface of the image sensor SE. Here, the incident angle of the sensing light 400 may be same with the reflection angle α shown in the FIG. 2.

As the sensing light 400 has the incident angle to the upper surface of the image sensor SE, the light amount provided to the photo sensor is reduced. This may cause the degradation of the detection accuracy. In order to increase the detection accuracy, the sensing light 400 enters into the upper surface of the image sensor SE along to the normal direction. In the second embodiment of the present disclosure, we provide a structure in which the sensing light 400 enters into the upper surface of the image sensor SE along to the normal direction to the upper surface.

Second Embodiment

Figure 4:
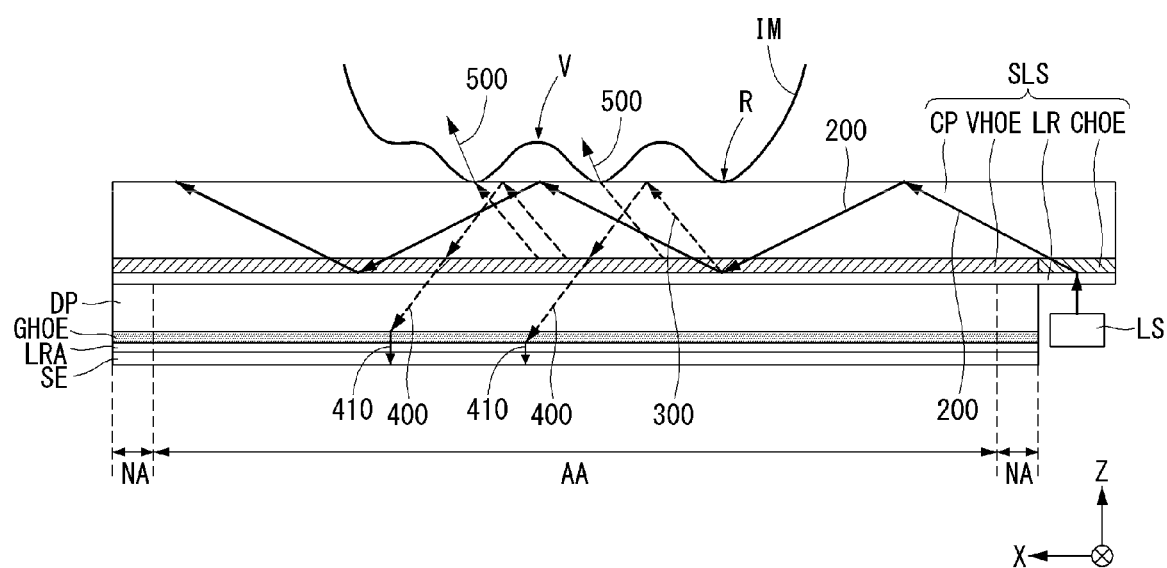
FIG. 4 is a cross-sectional view illustrating a structure of a flat panel display having an optical image sensor in which the light accuracy is maximized, according to a second embodiment of the present disclosure.

Referring to FIG. 4, we will explain about a structure for maximizing the light efficiency in the flat panel display having an optical image sensor according to the second embodiment of the present disclosure. FIG. 4 is a cross-sectional view illustrating a structure of a flat panel display having an optical image sensor in which the light accuracy is maximized, according to the second embodiment of the present disclosure.

Referring to FIG. 4, a flat panel display having an optical image sensor according to the second embodiment of the present disclosure comprises a display panel DP, a directional optical substrate SLS, a light source LS and an image photo sensor (or 'image sensor') SE. Especially, a sensing light control film GHOE and an ultra low refractive layer LRA are disposed between the display panel DP and the image sensor SE.

The display panel DP includes a display area AA and a non-display area NA. The display area AA may be disposed at the middle portions of the display panel DP. The non-display area NA may be surrounding the display area AA. The display area AA may have a plurality of the display elements for representing the video images shown on the display panel DP. The non-display area may have a plurality of the driving elements for operating the display elements arrayed in the display area AA.

The sensing light control film GHOE is attached under the bottom surface of the display panel DP. The ultra low refractive layer LRA is attached under the bottom surface of the sensing light control film GHOE. Further, the image sensor SE is attached under the bottom surface of the ultra low refractive layer LRA.

The image sensor SE may have a rectangular thin film shape. The image sensor SE may be attached under the bottom surface of the display panel DP as corresponding to the display area AA. In this case, the sensing light control film GHOE and the ultra low refractive layer LRA may be the thin film shapes having the same surface area as the image sensor SE.

For example, a thin film type image sensor SE may have a plurality of photo sensors in which each photo sensor may be disposed as corresponding to each pixel. Otherwise, a thin film type image sensor SE may have a plurality of photo sensors in which each photo sensor may be disposed as corresponding to every pixel group including 2×2, 3×3 or 4×4 pixels.

The directional optical substrate SLS may be same as that of the first embodiment. The directional optical substrate SLS may be joined with the display panel DP as it is attached on the upper surface of the display panel DP. The directional optical substrate SLS includes a cover plate CP, a light incident film CHOE, a light radiating film VHOE and a low refractive layer LR, as mentioned above. The low refractive layer LR is attached on the upper surface of the display panel DP as facing each other.

The directional optical substrate SLS, as mentioned above, may provide the image sensing light 400 to the bottom surface of the cover plate CP, which faces with the upper surface of the display panel DP. In detail, the radiating light 300 generated by the light radiating film VHOE of the directional optical substrate SLS reaches to the upper surface of the cover plate CP. When an object IM is disposed on the cover plate CP, the radiating light 300 that hits at the position where the object IM is not directly contact on the cover plate CP is totally reflected at the upper surface of the cover plate CP and then is provided to the display panel DP. In the interim, at the area where the object IM is contacting, the radiating light 300 would be an absorbed light 500 so that it is not provided to the image sensor SE.

That is, the sensing light 400 from the radiating lights 300 is provided to the display panel DP, but the absorbed light 500 is not provided to the display panel DP. Passing through the display panel DP, the sensing light 400 enters into the sensing light control film GHOE.

The sensing light control film GHOE may be a holographic element that refracts the traveling direction of the sensing light 400 to the normal direction to the surface of the display panel DP. That is, the sensing light 400 is converted into the vertical sensing light 410 by the sensing light control film GHOE. After passing through the ultra low refractive layer LRA attached under the bottom surface of the sensing light control film GHOE, the vertical sensing light 410 enters into the image sensor SE.

The sensing light 400 provided from the directional optical substrate SLS passes through the display panel DP, is converted into the vertical sensing light 410 by the sensing light control film GHOE, and then enters into the image sensor SE. Detecting the vertical sensing light 410 converted from the sensing light 400 reflected at the top surface of the cover plate CP, the image sensor SE reproduces the patterns or images of the object IM.

As receiving the vertical sensing light 410 vertically entering into the image sensor SE, the amount of the light entering into the image sensor SE may be maximized. Therefore, the detection accuracy may be maximized. Further, the ultra low refractive layer LRA is disposed between the sensing light control film GHOE and the image sensor SE. In one embodiment, the refractive index of the ultra low refractive layer LRA is less than 1.1. In a second embodiment, the refractive index of the ultra low refractive layer LRA is less than or equal to 1.06. Here, the term of 'ultra low refractive layer' is used for the meaning that the refractive index of the ultra low refractive layer is very similar with the refractive index of air, 1.0.

Figure 5:
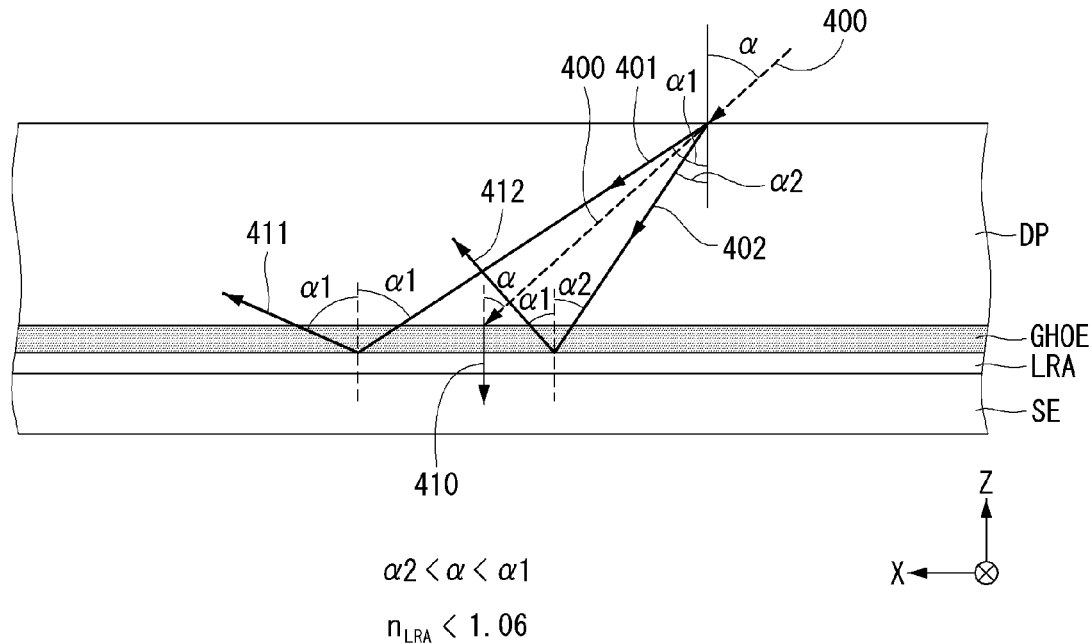
FIG. 5 is an enlarged cross-sectional view illustrating a structure of a flat panel display having an optical image sensor in which the light accuracy is maximized, according to the second embodiment of the present disclosure.

The ultra low refractive layer LRA is equipped for eliminating the noise light which may be caused by the scattering lights as the sensing light 400 is passing through the display panel DP and for maximizing the detection accuracy of the sensing light 400. Referring to FIG. 5, we will explain about the structure for maximizing the detection accuracy of the sensing light in the flat panel display having an optical image sensor according to the second embodiment of the present disclosure. FIG. 5 is an enlarged cross-sectional view illustrating a structure of a flat panel display having an optical image sensor in which the light accuracy is maximized, according to the second embodiment of the present disclosure.

The sensing light 400 enters into the display panel DP through the upper surface of the display panel DP. In detail, the sensing light 400 enters into the display panel DP having an incident angle same with the reflection angle α. That is, the sensing light 400 enters into the display panel DP with the incident angle of α to the normal line to the upper surface of the display panel DP. After entering into the display panel DP, the sensing light 400 may be scattered by the elements disposed inside of the display panel DP. For example, most of the sensing light 400 may pass through the display panel DP as maintaining as it enters, but others of the sensing light 400 may be scattered or changed the light path as a first diffused light 401 and/or a second diffused light 402.

In detail, the first diffused light 401 may be scattered as a first light entering into the display panel DP having a first incident angle α1 larger than the incident angle α of the sensing light 400. Further, the second diffused light 402 may be scattered as a second light entering into the display panel DP having a second incident angle α2 smaller than the incident angle α of the sensing light 400.

The sensing light 400 having the incident angle of α is refracted to the normal direction to the display panel DP by the sensing light control film GHOE. The sensing light control film GHOE may be a holographic element which is made by recording the holographic pattern using a reference light having the incident angle α and an object light parallel to the normal direction. Therefore, the sensing light 400 is converted into the vertical sensing light 410 by the sensing light control film GHOE and then sent to the image sensor SE. On the contrary, the first diffused light 401 and the second diffused light 402 having different incident angles from that of the sensing light 400 are not converted but passing the sensing light control film GHOE.

The first diffused light 401 and the second diffused light 402 passing through the sensing light control film GHOE are reflected at the interface with the ultra low refractive layer LRA and then enter back to the display panel DP. In detail, the first diffused light 401 is reflected as the first reflecting light 411 having the first incident angle α1 at the interface between the sensing light control film GHOE and the ultra low refractive layer LRA so that the first diffused light 401 does not enter into the image sensor SE. The second diffused light 402 is also reflected as the second reflecting light 412 having the second incident angle α2 at the interface between the sensing light control film GHOE and the ultra low refractive layer LRA so that the second diffused light 402 does not enter into the image sensor SE, neither.

The ultra low refractive layer LRA eliminates the scattered lights having different from the incident angle α of the sensing light 400. Especially, in order to totally reflect the scattered lights having the incident angle less than the incident angle α of the sensing light 400, the refractive index of the ultra low refractive layer LRA is very similar with the refractive index of air. So that this refractive index can be called as "air-like refractive index". In the second embodiment, we use the term of "ultra low refractive layer".

In the second embodiment of the present disclosure, the scattered noise lights from the sensing light 400 are eliminated by the sensing light control film GHOE and the ultra low refractive layer LRA attached under the bottom surface of the display panel DP. Only not scattered sensing light 400 is selectively sent to the image sensor SE. As the results, the detection accuracy can be maximized.

Third Embodiment

Figure 6:
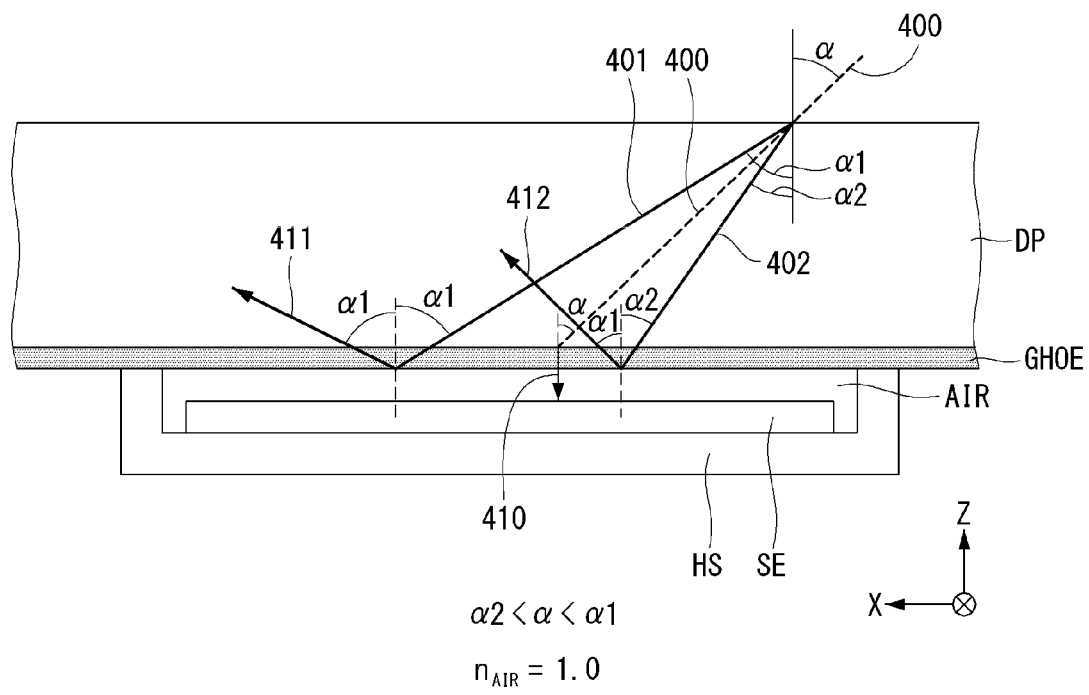
FIG. 6 is an enlarged cross-sectional view illustrating a structure of a flat panel display having an optical image sensor in which the light accuracy is maximized, according to a third embodiment of the present disclosure.

Referring to FIG. 6, we will explain about the third embodiment of the present disclosure. In the third embodiment, the flat panel display may have an image sensor SE having the different structure from the second embodiment. In the third embodiment, a volumetric photo image sensor SE not the thin film type is equipped with the flat panel display. For the flat panel display having the photo image sensor according to the third embodiment of the present disclosure may have a directional optical unit same as the first and second embodiments, so that the structure for the directional optical unit may not be duplicated in convenience. FIG. 6 is an enlarged cross-sectional view illustrating a structure of a flat panel display having an optical image sensor in which the light accuracy is maximized, according to the third embodiment of the present disclosure.

Referring to FIG. 6, the sensing light control film GHOE is attached under the bottom surface of the display panel DP. The image sensor SE is disposed under the some portions of the sensing light control film GHOE. Here, the image sensor SE is mounted inside bottom surface of the housing HS, and the housing HS is attached under the bottom surface of the sensing light control film GHOE. Therefore, the image sensor SE is disposed as being apart from the sensing light control film GHOE with a predetermined distance. An air layer AIR is disposed between the sensing light control film GHOE and the image sensor SE.

Hereinafter, we will explain about the light path of the sensing light 400 in the third embodiment of the present disclosure. The sensing light 400 enters into the display panel DP through the upper surface of the display panel DP. Especially, the sensing light 400 enters with an incident angle same with the reflection angle α. That is, the sensing light 400 enters into the display panel DP with the incident angle of α to the normal line to the upper surface of the display panel DP. After entering into the display panel DP, the sensing light 400 may be scattered by the elements disposed inside of the display panel DP. For example, most of the sensing light 400 may pass through the display panel DP as maintaining as it enters, but others of the sensing light 400 may be scattered or changed the light path as a first diffused light 401 and/or a second diffused light 402.

In detail, the first diffused light 401 may be scattered as a first light entering into the display panel DP having a first incident angle α1 larger than the incident angle α of the sensing light 400. Further, the second diffused light 402 may be scattered as a second light entering into the display panel DP having a second incident angle α2 smaller than the incident angle α of the sensing light 400.

The sensing light 400 having the incident angle of α is refracted to the normal direction to the display panel DP by the sensing light control film GHOE. The sensing light control film GHOE may be a holographic element which is made by recording the holographic pattern using a reference light having the incident angle α and an object light parallel to the normal direction. Therefore, the sensing light 400 is converted into the vertical sensing light 410 by the sensing light control film GHOE and then sent to the image sensor SE. On the contrary, the first diffused light 401 and the second diffused light 402 having different incident angles from that of the sensing light 400 are not converted but passing the sensing light control film GHOE.

The first diffused light 401 and the second diffused light 402 passing through the sensing light control film GHOE are reflected at the interface with the air layer AIR and then enter back to the display panel DP. In detail, the first diffused light 401 is reflected as the first reflecting light 411 having the first incident angle α1 at the interface between the sensing light control film GHOE and the air layer AIR so that the first diffused light 401 does not enter into the image sensor SE. The second diffused light 402 is also reflected as the second reflecting light 412 having the second incident angle α2 at the interface between the sensing light control film GHOE and the air layer AIR so that the second diffused light 402 does not enter into the image sensor SE, neither.

In the third embodiment of the present disclosure, the scattered noise lights from the sensing light 400 are eliminated by the sensing light control film GHOE and the air layer AIR attached under the bottom surface of the display panel DP. Only not scattered sensing light 400 is selectively sent to the image sensor SE. As the results, the detection accuracy can be maximized. In one embodiment, the scattering lights are eliminated from the sensing light 400 using the air layer AIR. Otherwise, like the second embodiment, the ultra low refractive layer LRA may be replaced with the air layer AIR.

While the embodiment of the present disclosure has been described in detail with reference to the drawings, it will be understood by those skilled in the art that the disclosure can be implemented in other specific forms without changing the technical spirit or essential features of the disclosure. Therefore, it should be noted that the forgoing embodiments are merely illustrative in all aspects and are not to be construed as limiting the disclosure. The scope of the disclosure is defined by the appended claims rather than the detailed description of the disclosure. All changes or modifications or their equivalents made within the meanings and scope of the claims should be construed as falling within the scope of the disclosure.

What is claimed is:

1. A flat panel display having an image sensor comprising:
    a display panel including a display area and a non-display area, the display panel having a top surface;
    a directional optical unit attached to the top surface of the display panel, the directional optical unit having a length along a length axis of the display panel, a width along a width axis of the display panel and a thickness along a thickness axis of the display panel;
    a sensing light control film disposed under the display panel; and
    an image sensor disposed under the sensing light control film,
    wherein the directional optical unit includes:
        a cover plate having a size corresponding to the length and the width of the directional optical unit;
        a light radiating film corresponding to the display area, the light radiating film positioned under the cover plate;
        a light incident film positioned under the cover plate and disposed outside of the display area adjacent to a lateral side of the light radiating film;
        a low refractive layer disposed under the light radiating film and the light incident film, the low refractive layer attached on the top surface of the display panel, and having a refractive index that is lower than a refractive index of the cover plate and that is lower than a refractive index of the light radiating film; and
    a light source positioned under the light incident film.

2. The flat panel display according to claim 1, wherein the light source provides an incident light to an incident point on a surface of the light incident film,
    wherein the light incident film includes a first holographic pattern that converts the incident light to a propagating light having an incident angle satisfying an internal total reflection condition of the cover plate, and that transmits the propagating light into the cover plate, and
    wherein the light radiating film includes a second holographic pattern that converts a first portion of the propagating light into the sensing light, the sensing light having a reflection angle that satisfies a total reflection condition at a top surface of the cover plate and that satisfies a transmitting condition through the low refractive layer.

3. The flat panel display according to claim 2, wherein the propagating light has an expanding angle on a horizontal plane including the length axis and the width axis, and the propagating light maintains a collimated state on a vertical plane including the length axis and the thickness axis,
    wherein the incident angle is larger than an internal total reflection critical angle at a first interface between the light radiating film and the low refractive layer, and
    wherein the reflection angle is larger than a total reflection critical angle at a second interface between the cover plate and an air layer, and smaller than a total reflection critical angle at the first interface between the light radiating film and the low refractive layer.

4. The flat panel display according to claim 1, wherein the sensing light control film includes:

a holographic element refracting a sensing light having a predetermined direction to a parallel direction to a normal line to a bottom surface of the display panel.

5. The flat panel display device according to the claim 4, further comprising:

an ultra low refractive layer disposed between the sensing light control film and the image sensor, having a surface area corresponding to the sensing light control film, and having a refractive index higher than 1.0 and lower than 1.1, wherein the image sensor has a thin film shape having an area corresponding to the sensing light control film.

6. The flat panel display according to the claim 4, further comprising:

a housing disposed under the sensing light control film, and having a size corresponding to some portions of the sensing light control film, wherein the image sensor is disposed inside of the housing as being apart from the sensing light control film with a predetermined distance, and wherein an air layer is disposed between the sensing light control film and the image sensor.

\* \* \* \* \*